Oct. 5, 1926.
A. G. GIRARD
AUTOMOBILE LOADING SUPPORT
Filed Nov. 24, 1922
1,602,377
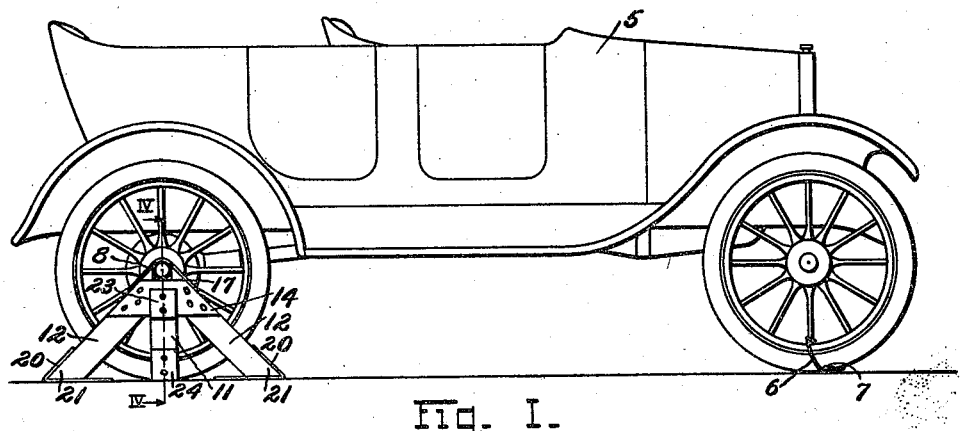
INVENTOR.
Arthur G. Girard
BY Solon J. Boughton
ATTORNEY Patented Oct. 5, 1926.

1,602,377

UNITED STATES PATENT OFFICE.

ARTHUR G. GIRARD, OF TOLEDO, OHIO, ASSIGNOR TO THE WILLYS-OVERLAND COMPANY, OF TOLEDO, OHIO, A CORPORATION.

AUTOMOBILE LOADING SUPPORT.

Application filed November 24, 1922. Serial No. 602,938.

This invention relates to the loading of automobiles in freight cars or other vehicles, and an object of the invention is to provide for supporting and firmly securing the automobile to the floor of the vehicle in a convenient manner, and with a minimum cost of material and labor. Other objects relating to details of construction, will appear as I proceed with the description to follow.

Referring to the drawings forming a part hereof,

Figure I is a side elevation of an automobile showing my invention applied thereto;

Fig. II is a perspective view of the supporting frame as it appears when in use;

Fig. III is a view similar to Fig. II, but with the securing straps only partially attached;

Fig. IV is a vertical sectional view taken on the line IV—IV of Figure I.

Throughout the several views, the same reference numbers are used to refer to the same parts.

According to Figure I, an automobile 5 is shown having a front wheel held down to the floor by a tie rope 6, the rope being given a turn about one spoke, and the ends fastened by clamps 7 to the floor.

A sleeve 8 having a flange 9 at one end, fits over the hub of the rear wheel, the hub cap having preferably been first removed to avoid injury thereto. The flange 9 abuts the inner side of the supporting frame, and prevents outward movement of the sleeve in the frame, while the enlarged central portion of the wheel abuts the flanged end of the sleeve. The supporting frame for this wheel comprises essentially an inverted V-shaped frame 10 having a lateral brace 11 to give the frame the necessary lateral stiffness. The aforesaid frame is built up of two similar diagonal members or legs 12 secured together at their upper ends by side plates 14 preferably nailed thereto. A notch 15 is cut into the upper end of each of the members 12, and these notches are arranged to face each other and together form a single opening shown as rectangular, whose lower side is substantially flush with the tops of the side plates 14. In this opening is received the sleeve 8 fitting on the wheel hub. The sleeve and hub are retained in the opening formed by the notches 15 by a strap 17 which is bent over the sleeve 8 and made fast at its opposite ends to the members 12, preferably by nails in the manner shown. The lower end or foot of each leg 12 is firmly secured to the floor by nails and by a strap 20. This strap, which may comprise a strip of sheet iron, fits around the point 21 of the member 20, forming in effect, a socket therefor. In applying this strip, it is first nailed at one end to the floor in such a position as to be covered by the foot 21. The frame is then placed thereon and the free end is bent up to lie against the top or outer face of leg 12. That end is then nailed fast to the leg. One nail at least, that nearest the point 21, will pass through both thicknesses of the strap 20, the foot, and into the floor. Preferably, at least one of these nails will be positioned to be covered by a leg of the frame, the weight carried by the leg thereby assisting in preventing withdrawal of the nail. In Fig. III, I have shown the straps 20 nailed to the floor and the supporting frame resting upon the strips which are now ready to be bent up and nailed to the frame. In the same manner, the brace 11 is secured to one of the plates 14 by a strap 23 and to the floor by a strap 24. A decided advantage results from this method of securing the frame to the floor, over that in the case were the strips turned to extend in the opposite direction, that is, outwardly from the points 21 of the feet.

According to the construction disclosed herein, the nails are subjected to a shearing stress only, rather than to an outward pull, and the securing strip is put under tension only to resist the tendency of the frame members to spread. Furthermore, those nails whose heads are covered by the feet 21 are additionally held down in place by the weight of the automobile. A spreading or a longitudinal movement of the legs due to the weight of the automobile, or to severe shocks and jars, is effectually resisted and can take place only when the force is so great as to shear off the nails or tear in two, the securing straps. The brace 11 being secured to the plate 14 and to the floor by similar means, is likewise effective to resist to the same extent side thrusts which tend to tip over the supporting frames.

By means of the above described supports and the arrangement of the same at the outer face of the wheel to engage the wheel hub, all longitudinal movements of the automobile and transverse movements of the rear thereof, are effectually resisted. It then becomes necessary only to tie down the front wheels to prevent lateral shifting of the front end of the automobile. Important advantages of applying the supports to engage the rear wheel hubs, rather than some other part of the automobile, such as the axle, reside in the fact that the wheels need not be removed from the automobile when shipment is made, and also that all shocks and jars to which the automobile is subjected during shipment, are applied in the same manner in which the automobile is designed to receive shocks and jars when in actual service, namely, through the wheels. A further important advantage lies in the greater convenience to the workman engaged in loading automobiles with these supports, over arrangements formerly employed where it was necessary for him to crawl under the automobile and work in a cramped and unnatural position.

Having thus described my invention, what I claim as new and desire to secure by Letters Patent is:

1. An automobile loading support comprising an inverted V-shaped frame, the legs of which have contiguous surfaces, a portion of each of said legs being cut away at said surfaces to form an opening to receive a portion of said automobile, and side plates secured to opposite sides of said legs with their upper faces in alinement with the bottom of said opening.

2. An automatic loading support comprising a frame having a pair of inclined legs, means for binding said legs together at their upper ends, and means for securing the lower ends of said legs to a floor, said means comprising a strap having one portion secured to the floor and supporting one of said legs, and having another portion secured to the outer face of said leg.

3. An automobile loading support comprising a pair of diverging legs, a plate securing said legs together at their upper adjacent ends, a lateral brace, and means for securing said brace to said plate comprising a strap bent over the end of said brace, one end being secured to said brace and the other end being secured to said plate.

4. In an automobile loading support, a frame comprising a pair of diverging legs, the upper adjacent ends thereof being notched to provide complemental portions of a single opening, a sleeve supported in said opening and adapted to fit over a wheel hub of said automobile, and a strap secured at its ends to said legs with an intermediate portion passing over said sleeve.

5. The method of securing the diverging legs of an automobile loading support to a floor by the use of a strap which consists in fastening down one end portion of said strap to the floor, placing a leg on said portion, bending up the free end of said strap to lie against the outer face or edge of said leg, and securing said end thereto.

In testimony whereof, I affix my signature.

ARTHUR G. GIRARD.